Patented Feb. 8, 1927.

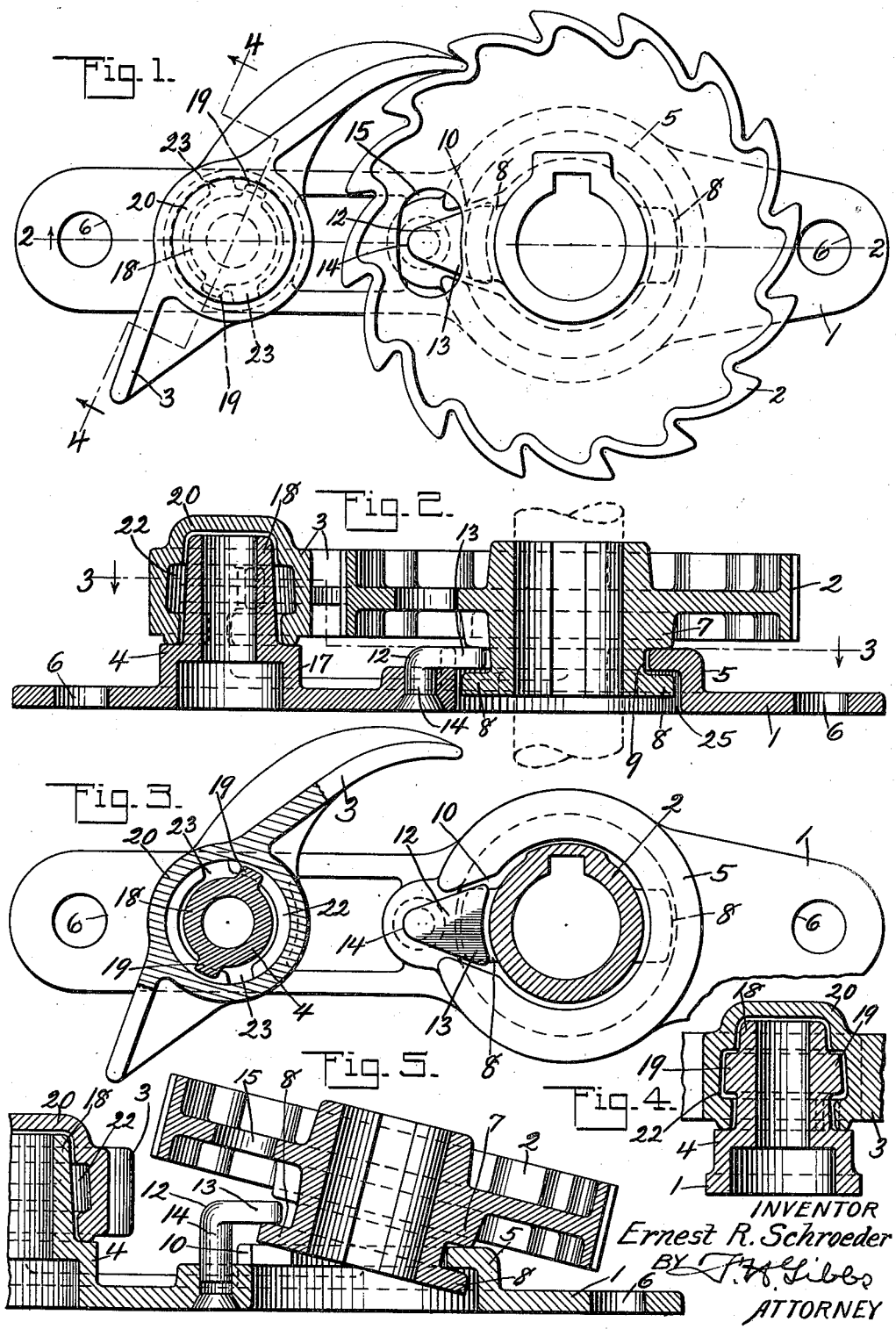

1,616,599

UNITED STATES PATENT OFFICE.

ERNEST R. SCHROEDER, OF HAWTHORNE, NEW JERSEY, ASSIGNOR TO AMERICAN CAR AND FOUNDRY COMPANY, OF NEW YORK, N. Y., A CORPORATION OF NEW JERSEY.

BRAKE MECHANISM.

Application filed January 5, 1926. Serial No. 79,346.

In the drawings:

Figure 1 is a plan view of a pawl and rachet mechanism constructed in accordance with the invention;

Fig. 2 is a sectional view along the line 2—2 of Fig. 1;

Fig. 3 is a sectional view along the line 3—3 of Fig. 2,

Fig. 4 is a sectional view along the line 4—4 of Fig. 1 illustrating the mounting of the ratchet wheel on the base plate, and Fig. 5 is a view similar to Fig. 2 showing one of the parts tilted for removal or insertion, certain parts being partly broken away.

It is an object of the invention to provide a brake shaft with a pawl and ratchet mechanism having provision for securely holding the pawl and the ratchet in operative position by a single locking member. It is also an object of the invention to provide a pawl and ratchet brake mechanism with means for locking the ratchet wheel on the base plate and means for preventing removal of the pawl from the base plate when the ratchet wheel is mounted in position.

Referring to the drawing, a pawl and ratchet mechanism for a brake shaft is illustrated comprising a base plate 1 having a ratchet wheel 2 and a pawl 3 mounted thereon. The base plate 1 is provided with a post 4 for pivotally supporting the pawl 3 and a raised collar 5 for supporting the ratchet wheel 2. A recess 25 is formed in the base plate at the collar 5 and holes 6 are provided for bolting the plate in positon.

The ratchet wheel 2, which is adapted to be keyed in any suitable manner to a brake shaft, is provided with a hub portion 7 having two lugs 8 extending radially therefrom. The hub 7 is provided with a reduced section 9 for roughly fitting in the opening through the collar 5 in the base plate 1. The collar 5 in the base plate has a groove or slot 10 therein as shown in Figs. 1 and 3 of the drawing. Such groove or slot 10 is made wide enough for permitting one of the lugs 8 to pass therethrough into the recess 25 below the collar. When mounting the ratchet wheel in position one of the lugs 8 is placed under the collar 5 as shown in Fig. 5, and the other lug 8 is moved through the slot 10 into a position below the collar.

A locking member 12 is provided for closing the slot 10 when the ratchet wheel is mounted in position. The locking member 12 comprises a section 13, which is adapted to roughly fit the slot 10, and a portion 14 which is adapted to be riveted to the base plate. An opening 15 is provided in the ratchet wheel 2 for permitting the inserting or removing of the locking member 12: for this purpose, the portion 13 of said member may be tilted upward and outward in order to pass the opening. After the locking member is inserted in position, the end thereof is riveted in the base plate as indicated in Fig. 2 of the drawing. In the above structure, it will be noted the ratchet wheel 2 is free to rotate on the base plate 1 and is held in position by the lugs 8 which are located below the collar 5 and the section 13 of the locking member 12.

The post 4, which pivotally supports the pawl 3, comprises a cylindrical portion 17 and a reduced tapered portion 18. Two lugs 19 project from the tapered section 18 for forming a bayonet lock with the pawl 3. The pawl 3, which is adapted to engage the teeth on the ratchet wheel for holding a brake in any set position, is provided with a cup-shaped portion 20 adapted to roughly fit over the tapered portion 18 of the post 4. The cup-shaped portion 20 is provided with an internal recess 22 for receiving the lugs 19 when the pawl is mounted in position. Two slots 23 are formed in the lower part of the cup-shaped portion of the pawl which rests on the cylindrical portion 17 of the post 4. The slots 23 permit the lugs 19 to pass therethrough when mounting the pawl in position.

The lugs 19 on the post 4 and the slots 23 in the pawl 3, which form a bayonet connection between the pawl and the base plate, are so positioned with respect to each other as to make it impossible to mount the pawl on the post when the ratchet wheel 2 is mounted in position. Thus it is necessary to mount the pawl in position prior to the mounting of the ratchet wheel. The bayonet lock above described insures against the pawl being dismounted without first dismounting the ratchet wheel.

Attention is called to the fact that the cup portion of the pawl completely covers the pivoted connection between the pawl and base plate and protects such connection from the weather. In the pawl and ratchet mechanism above described particular attention is called to the bayonet connection of the pawl to the base plate which prevents the pawl being mounted or dismounted except when the ratchet wheel is dismounted, and attention is further called to the fact that a single locking member serves to securely lock the ratchet wheel and also the pawl to the base plate.

What is claimed is:

1. In a brake mechanism, a base plate, a ratchet wheel mounted on said base plate, a pawl for engaging said ratchet wheel, and a bayonet lock between said pawl and the base plate for preventing dismounting the pawl when the ratchet wheel is mounted on said plate.

2. In a brake mechanism, a base plate, a ratchet wheel mounted on said base plate, a pawl for engaging said ratchet wheel, a bayonet lock between said pawl and the base plate for preventing dismounting the pawl when the ratchet wheel is mounted on said plate, and a single locking member for securing the ratchet wheel to the base plate.

3. In a brake mechanism, a base plate, a ratchet wheel mounted on said base plate, a pawl mounted on said base plate in operative relation to said ratchet wheel, a single detachable locking member for securing the ratchet wheel to the base plate, and means for preventing the removal of the pawl when the ratchet is in position on the base plate.

4. In a brake mechanism, a base plate having a post thereon, a ratchet wheel mounted on said base plate, a pawl pivotally mounted on said post for engaging said ratchet wheel, and a lug and slot connection formed between the post and pawl for holding the pawl in position and for permitting removal of the pawl from the base plate only when the ratchet wheel is dismounted.

5. In a brake mechanism, a base plate having a post thereon, a ratchet wheel mounted on said base plate, a pawl having a cup-shaped portion for rotatably supporting the pawl on and for covering said post, and a bayonet lock between said post and the pawl for preventing removal of the pawl from the post when the ratchet wheel is mounted in position.

6. In a brake mechanism, a base plate having a post thereon, a ratchet wheel mounted on said base plate, a pawl having a cup-shaped portion for mounting on said post, and a bayonet connection between the post and the pawl formed by projections on the post and slots in the pawl, said bayonet connection serving to prevent dismounting the pawl except when the ratchet wheel is dismounted.

7. In a brake mechanism, a base plate, a ratchet wheel mounted on said base plate, a pawl for engaging said ratchet wheel, pivotal supporting means for the pawl on the plate serving to prevent dismounting of the pawl when the ratchet wheel is in position, and a single locking member for securing the ratchet wheel to the plate.

8. In a brake mechanism, a base plate, a ratchet wheel mounted on said plate, a pawl mounted on said plate, means for preventing dismounting of the pawl when the ratchet wheel is mounted in position, and a locking member secured to the base plate for holding the ratchet wheel in position, said ratchet wheel having an opening formed therein for permitting insertion and removal of the locking member therethrough.

9. In a brake mechanism, a base plate, a ratchet wheel mounted on said plate, a pawl pivotally mounted on said plate for engaging the ratchet wheel, said pawl being shaped to cover the pivotal connection between it and the plate and protect such connection from the weather.

10. In a brake mechanism, a base plate having a raised collar with a slot therein, a ratchet wheel having a hub portion with projecting lugs thereon, said ratchet wheel being mounted on the plate with said lugs extending underneath said collar, a latching member secured to the plate for closing the slot in said collar to prevent dismounting the ratchet wheel, and a pawl mounted on said plate for engaging the ratchet wheel.

In witness whereof I have hereunto set my hand.

ERNEST R. SCHROEDER.